United States Patent
Williams

(10) Patent No.: US 9,882,629 B2
(45) Date of Patent: Jan. 30, 2018

(54) FACILITATION OF DUAL MODE WIRELESS DEVICE TRANSMISSIONS

(71) Applicant: AT&T Mobility II LLC, Atlanta, GA (US)

(72) Inventor: David Williams, Rowlett, TX (US)

(73) Assignee: AT&T MOBILITY II LLC, Atlanta, GA (US)

( * ) Notice: Subject to any disclaimer, the term of this patent is extended or adjusted under 35 U.S.C. 154(b) by 104 days.

(21) Appl. No.: 14/947,054

(22) Filed: Nov. 20, 2015

(65) Prior Publication Data

US 2017/0149491 A1    May 25, 2017

(51) Int. Cl.
H04B 7/185    (2006.01)

(52) U.S. Cl.
CPC ............................ H04B 7/185 (2013.01)

(58) Field of Classification Search
CPC .................. H04B 7/185; H04W 84/12
See application file for complete search history.

(56) References Cited

U.S. PATENT DOCUMENTS

| | | | |
|---|---|---|---|
| 6,968,394 B1 * | 11/2005 | El-Rafie | H04L 69/16 455/3.01 |
| 8,745,267 B2 | 6/2014 | Luecke et al. | |
| 8,913,509 B2 | 12/2014 | Kamdar et al. | |
| 8,982,694 B2 | 3/2015 | Zhang et al. | |
| 8,988,997 B2 | 3/2015 | Cabrera | |
| 9,042,214 B2 | 5/2015 | Knox | |
| 9,077,649 B2 * | 7/2015 | Kotecha | H04W 28/24 |
| 2006/0010352 A1 * | 1/2006 | Mukherjee | G06F 11/0724 714/47.2 |
| 2013/0058212 A1 | 3/2013 | Noy et al. | |
| 2013/0229945 A1 | 9/2013 | Cha et al. | |
| 2013/0258922 A1 | 10/2013 | Park | |
| 2013/0322251 A1 * | 12/2013 | Kotecha | H04W 28/24 370/236 |
| 2014/0133456 A1 | 5/2014 | Donepudi et al. | |
| 2014/0323178 A1 | 10/2014 | Wei et al. | |
| 2014/0328190 A1 | 11/2014 | Lord et al. | |
| 2014/0359423 A1 * | 12/2014 | Doan | G06F 17/2247 715/234 |
| 2015/0124616 A1 | 5/2015 | Lohman et al. | |
| 2015/0124676 A1 | 5/2015 | Song et al. | |

OTHER PUBLICATIONS

"Mobile Broadband Networks Can Manage Congestion While Abiding by Open Internet Principles", CTC Technology and Energy, Nov. 2014, 36 pages.
Frost, et al., "Satellite Backhaul of 3G and LTE Radio Access Networks", Market Insight, 13 pages. Retrieved on Feb. 19, 2016.

* cited by examiner

Primary Examiner — Jianye Wu
(74) Attorney, Agent, or Firm — Amin, Turocy & Watson, LLP

(57) ABSTRACT

A more efficient wireless communication network can be achieved by using various routes to transmit upload data and download data. Resource request data can be uploaded via a telecommunications network and resource data can be downloaded using satellite devices. The resource request data can be tagged with metadata based on a determination of a system fault. The metadata can indicate which device should receive the resource data, thereby determining which route is more efficient.

20 Claims, 12 Drawing Sheets

FACILITATION OF DUAL MODE WIRELESS DEVICE TRANSMISSIONS

TECHNICAL FIELD

This disclosure relates generally to facilitating wireless communication between wireless network devices. More specifically, this disclosure relates to uploading wireless data via a base station device and downloading wireless data via a satellite device.

BACKGROUND

A wireless router is a device that performs the functions of a router and also includes the functions of a wireless access point. It is used to provide access to the Internet or a private computer network. It can function in a wired local area network (LAN), in a wireless-only LAN (WLAN), or in a mixed wired/wireless network, depending on the manufacturer and model. Wireless fidelity (Wi-Fi) is a local area wireless computer networking technology that allows electronic devices to network, mainly using a 2.4 gigahertz (12 cm) ultra high frequency (UHF) and 5 gigahertz (6 cm) super high frequency (SHF) industrial, scientific, and medical (ISM) radio bands.

Many devices can use such as: personal computers, video-game consoles, smartphones, digital cameras, tablet computers and digital audio players. These devices can connect to a network resource such as the Internet via a wireless network access point. Such an access point (or hotspot) can have a range of about 20 meters (66 feet) indoors and a greater range outdoors. Hotspot coverage can be as small as a single room with walls that block radio waves, or as large as many square kilometers achieved by using multiple overlapping access points.

Wi-Fi can be less secure than wired connections, such as Ethernet, precisely because an intruder does not need a physical connection. Unencrypted internet access can easily be detected by intruders. Therefore, Wi-Fi has incorporated various encryption technologies such as: wired equivalent privacy (WEP), wired protected access (WPA, WPA2), or Wi-Fi protected setup (WPS).

The above-described background relating to a wireless routers and Wi-Fi is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
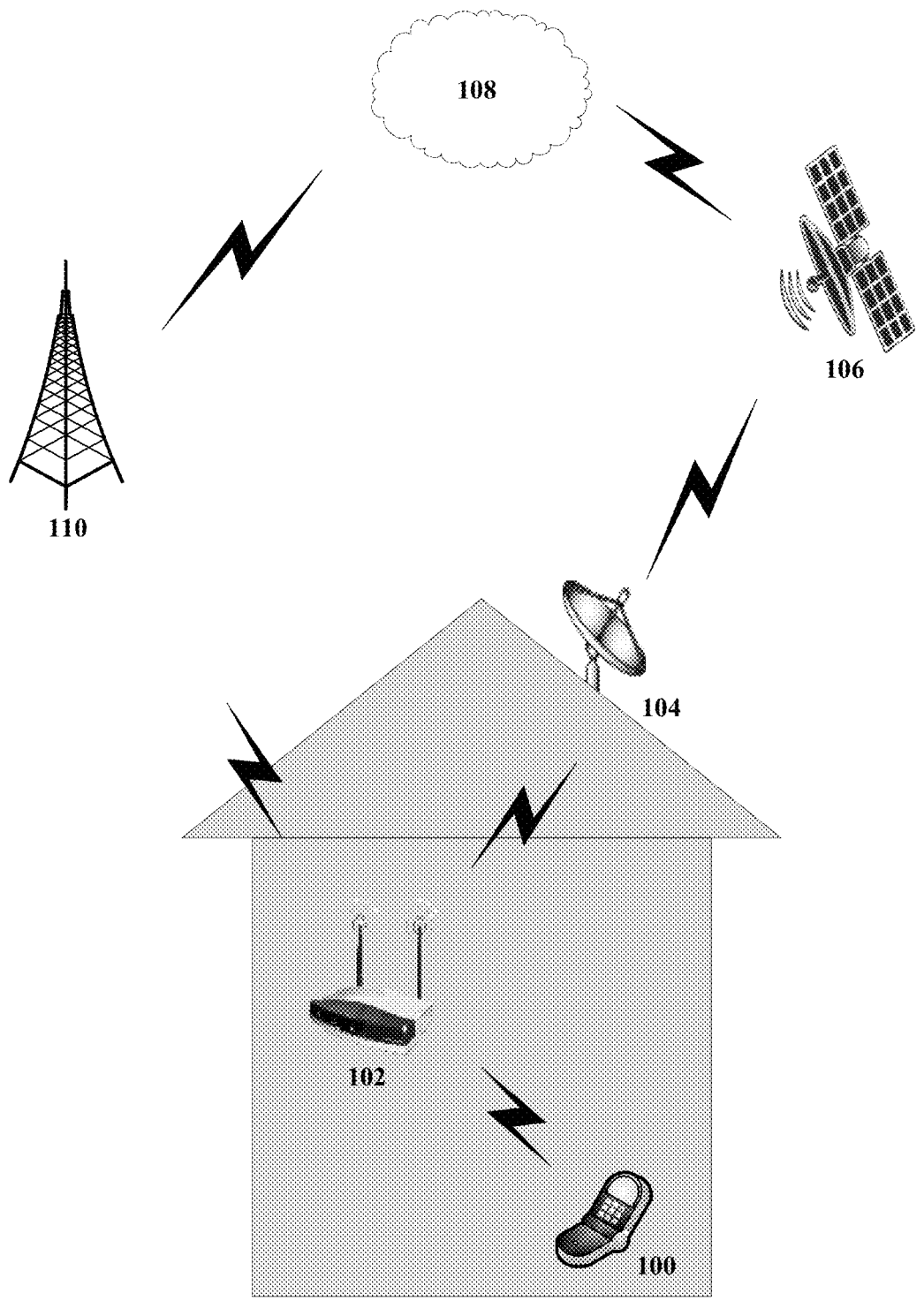
FIG. 1 illustrates an example wireless network comprising uploading resource request data via a base station device and downloading resource data via a satellite device according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of the various embodiments presented herein, to correct for the above-identified deficiencies and other drawbacks of wireless communication, various embodiments are described herein to facilitate a seamless handoff of communication between wireless network devices.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It is noted that although various aspects and embodiments are discussed herein with respect to Universal Mobile Telecommunications System (UMTS) and/or Long Term Evolution (LTE), the disclosed aspects are not limited to a UMTS implementation and/or an LTE implementation. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate communication between wireless network devices.

Facilitating communication between wireless networking devices can be implemented in connection with any type of device with a connection to a communications network such as: a mobile handset, a computer, a handheld device, or the like.

Leveraging separate upload and download data traffic for Wi-Fi device communication can result in increased efficiencies for wireless networking systems. Transmitting wireless upload data via satellite systems can be less efficient than transmitting wireless data via base station devices within telecommunications systems. However, the current disclosure can utilize satellite devices to transmit download data in a telecommunications network. For instance, wireless communication data from a Wi-Fi device can be transmitted to a base station device in response to a request from a mobile device. The base station device can then transmit the wireless communication data to a mobile satellite device. The mobile satellite device can then send the wireless communication to a stationary satellite device (on a home or business) as download data, and the stationary satellite device can then forward the wireless communication data back to the Wi-Fi device. Once the wireless communication data is received by the Wi-Fi device, from the stationary satellite device, the Wi-Fi device can send the requested data to a mobile device.

For the above-mentioned process to work, the wireless communication data can be labeled with a specific media access control (MAC) address related to the stationary satellite device so that the system can identify where to send the download data. In an alternate embodiment, the mobile satellite device can also be related to a MAC address and be allocated to service a particular stationary satellite device. Therefore, the Wi-Fi device can tag or label the wireless communication data with a MAC address associated with the mobile satellite device, thereby alleviating the need to label the wireless communication data with a MAC address associated with the stationary satellite device. Additionally, the wireless communication data can be tagged with the MAC address associated with the stationary satellite device and the MAC address associated with the mobile satellite device.

The Wi-Fi device can also determine if the MAC address associated with the stationary satellite device is a viable connection. Viability of the connection can be based upon download speed, data impedance, signal strength, time, distance, etc. If the Wi-Fi device determines that the MAC address associated with the stationary satellite device is not a viable connection, then the Wi-Fi device can initiate a sequence for the wireless communication data to be uploaded and downloaded via the base station device instead of leveraging the stationary satellite device for downloading data. The Wi-Fi device can periodically (i.e. based on time, based on a signal threshold, based on a probability of success, etc.) ping/check the stationary satellite device for an indication of the stationary satellite device's status. Alternatively, the stationary satellite device can perform a self-assessment. If the stationary satellite device determines there is an impedance or a communication error associated with the stationary satellite device, then the stationary satellite device can send data indicating that the stationary satellite, or the MAC address associated with the stationary satellite device, is not a viable communication alternative for the communication process. The stationary satellite device can periodically (i.e. based on time, a signal threshold, a probability of success, etc.) ping the Wi-Fi device with an indication of its status.

In an alternative embodiment, the system can upload wireless communication data, from the Wi-Fi device, to the mobile satellite device via a wireless connection between the stationary satellite device and the mobile satellite device. The wireless communication data can then be transmitted to a base station device as download data and be forwarded to the Wi-Fi device. The Wi-Fi device can then send the wireless communication data to a mobile device that requested a resource. Conversely, the wireless communication data can be uploaded and downloaded via the stationary satellite device and mobile satellite device connection in response to an indication that the telecommunication system comprising the base station is not a viable option.

It should be noted that the aforementioned processes can be leveraged with stationary constructs such as buildings or mobile constructs such as vehicles. For instance, military vehicles that comprise a satellite connection can leverage the above process for efficient communication. The process can be set as a default process or as a secondary process based on user requirements and/or network capabilities. For example, specific homes can be selected to use this process based on a ranking or offloading process to meet specific network requirements. If too many homes are leveraging data uploads via the base station device and data downloads via the satellite devices, then certain homes can be restricted to leveraging the base station device for data uploads and data downloads. Conversely, other homes can be restricted to leveraging the satellite devices for data uploads and data downloads, or any combination of the two.

It should also be noted that an artificial intelligence (AI) component can facilitate automating one or more features in accordance with the disclosed aspects. A memory and a processor as well as other components can include functionality with regard to the figures. The disclosed aspects in connection with facilitating wireless communication data uploads and downloads can employ various AI-based schemes for carrying out various aspects thereof. For example, a process for detecting that the stationary satellite device does not have a viable wireless connection can be facilitated with an example automatic classifier system and process. In another example, a process for detecting that the base station device does not have a viable wireless connection, can be facilitated with an example automatic classifier system and process. An example classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that can be automatically performed. In the case of communication systems, for example, attributes can be a frequency band and a technology and the classes can be an output signal value. In another example, the attributes can be a frequency band, a technology, and the presence of an object and the classes can be an output signal value.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed.

Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to modifying whether the stationary satellite device or the base station device is the default device for upload data. The criteria can include, but is not limited to, pre-defined values, frequency attenuation tables or other parameters, service provider preferences and/or policies, and so on.

In one embodiment, described herein is a method comprising receiving upload data and applying metadata to the upload data. The upload data is then sent to a base station device for transmission to a mobile satellite device. The mobile satellite device can then send the requested data, associated with the upload data, to a stationary satellite device based on the applying the metadata.

According to another embodiment, a system can facilitate, receiving upload data, associated with a data request, and applying metadata to the upload data. The upload data is then sent to a base station device for transmission to a mobile satellite device. However, the mobile satellite device sends data back via the base station device based upon a determination that a fault condition exists with a stationary satellite device. A Wi-Fi device can then send the requested data to a mobile device.

According to yet another embodiment, described herein is a machine-readable storage medium that can perform the operations comprising receiving upload data and applying metadata to the upload data. The upload data is then sent to a base station device for transmission to a mobile satellite device. The mobile satellite device can then direct requested data, associated with the upload data, to a stationary satellite device based on the applying the metadata. The stationary satellite device can then send the requested data to a Wi-Fi device for transmission to a mobile device.

These and other embodiments or implementations are described in more detail below with reference to the drawings.

Referring now to FIG. 1, illustrated is an example wireless network comprising uploading resource request data via a base station device and downloading resource data via a satellite device according to one or more embodiments. A mobile device 100 can send a resource request, as resource request data, to a Wi-Fi device 102. The resource request data can comprise a request for a web site, video, music, etc. A stationary satellite device 104 can send a notification to the Wi-Fi device 102. The notification can indicate that the stationary satellite device 104 is open for communication with the Wi-Fi device 102 and a mobile satellite device 108. The Wi-Fi device 102 can tag the resource request data with metadata related to a MAC address associated with the stationary satellite device 104.

After the resource request data is transmitted from the Wi-Fi device 102 to a base station 110, the base station 110 can forward the information request to the wireless network 108. The wireless network 108 can provide the requested resource in the form of resource data related to the resource request. For instance, if the resource request was for a web site, the wireless network 108 can provide packet data associated with the web site. The wireless network can also tag the resource data with the metadata related to the MAC address associated with the stationary satellite device. The wireless network 108 can then forward the resource data to a mobile satellite device 106 associated with the wireless network 108. Based on the metadata related to the MAC address, the mobile satellite device 106 can forward the resource data to the stationary satellite device 104. The stationary satellite device can send the resource data to the Wi-Fi device 102, and the Wi-Fi device 102 can send the resource data to the mobile device 100.

Figure 2:
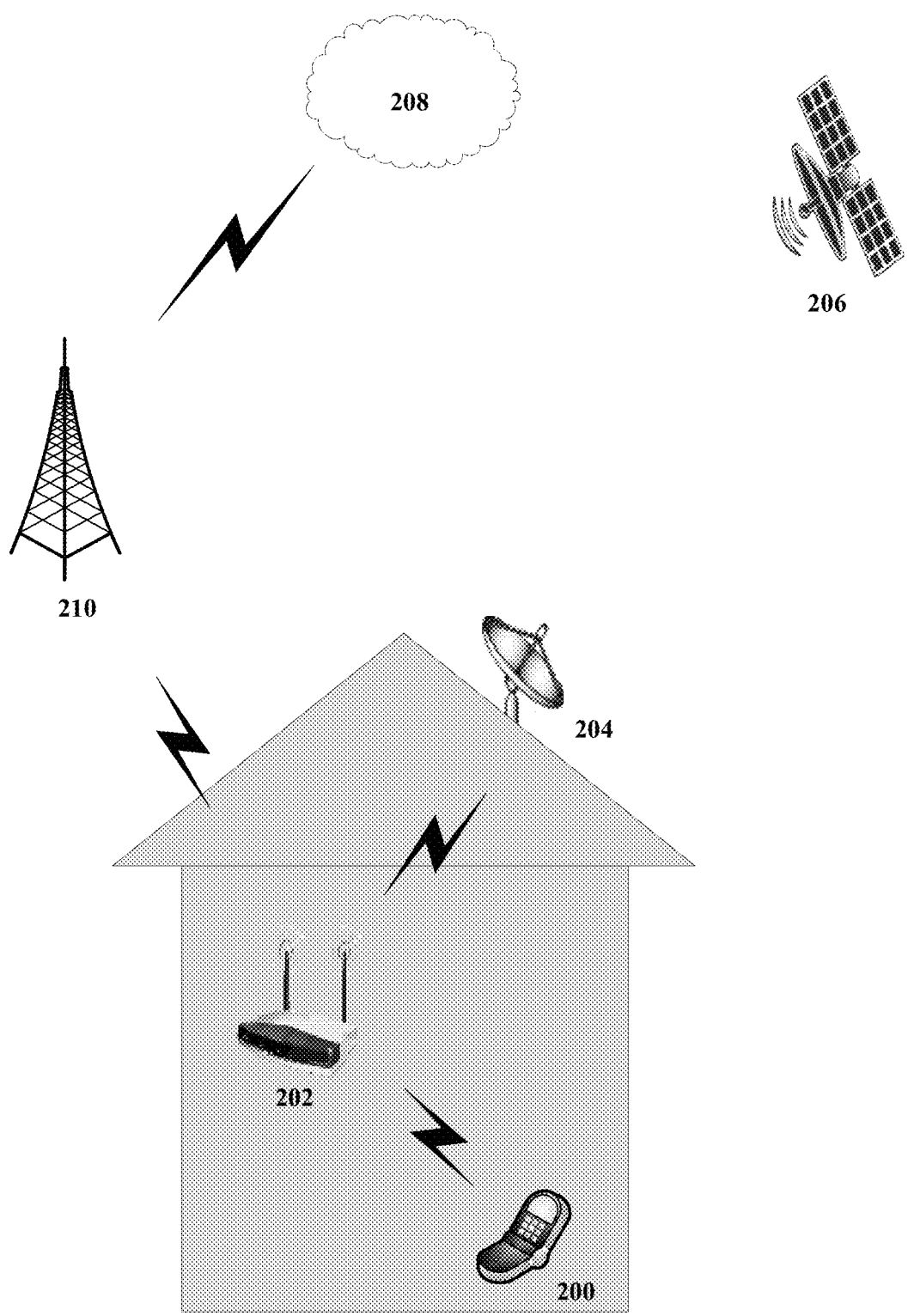
FIG. 2 illustrates an example wireless network performing uploading resource request data via a base station device and downloading resource data via the base station device in response to receiving an indication that a satellite device is not operational according to one or more embodiments.

Referring now to FIG. 2, illustrated is an example wireless network performing uploading resource request data via a base station device and downloading resource data via the base station device in response to receiving an indication that a satellite device is not operational according to one or more embodiments. A mobile device 200 can send a resource request, as resource request data, to a Wi-Fi device 202. The resource request data can comprise a request for a web site, video, music, etc. A stationary satellite device 204 can send a notification to the Wi-Fi device 202. The notification can indicate that the stationary satellite device 204 is not open for communication with the Wi-Fi device 202. The notification can also indicate that there is a lapse in communication with a mobile satellite device 206. The Wi-Fi device 202 can tag the resource request data with metadata related to a MAC address associated with the Wi-Fi device 202.

After the resource request data is transmitted from the Wi-Fi device 202 to a base station 210, the base station 210 can forward the resource request data to the wireless network 208. The wireless network 208 can provide the requested resource in the form of resource data related to the resource request. For instance, if the resource request was for a web site, the wireless network 208 can provide packet data associated with the web site. The wireless network can also tag the resource data with the metadata related to the MAC address associated with the Wi-Fi device 202. The wireless network 208 can then forward the resource data back to base station device 210 associated with the wireless network 208. Based on the metadata related to the MAC address, the base station device 210 can forward the resource data to the Wi-Fi device 202. The Wi-Fi device 202 can send the resource data to the mobile device 200.

Figure 3:
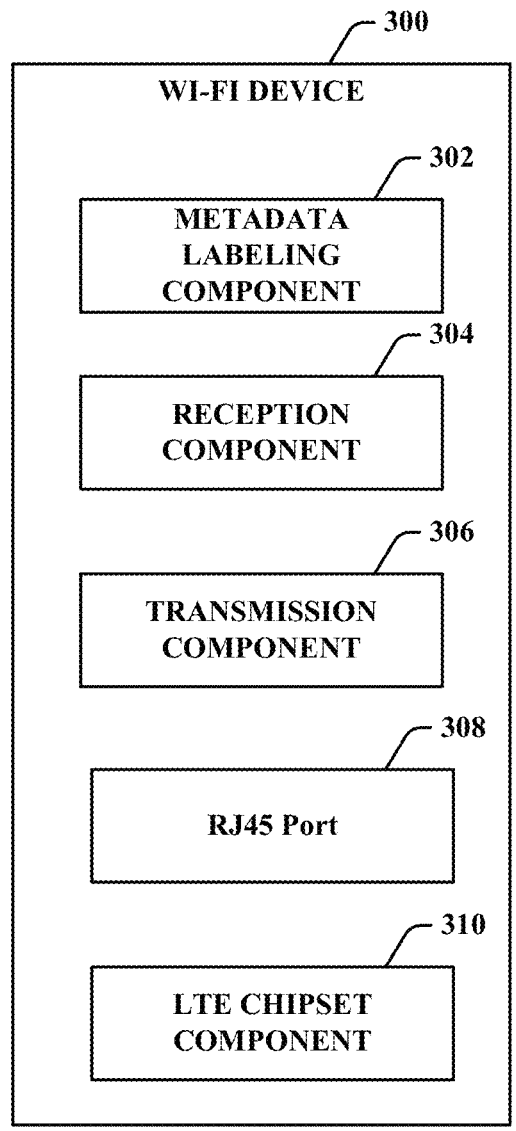
FIG. 3 illustrates an example wireless network device comprising a metadata labeling component according to one or more embodiments.

Referring now to FIG. 3, illustrated is an example wireless network device comprising a metadata labeling component according to one or more embodiments. A Wi-Fi device 300 can comprise several components to facilitate the above-mentioned process. A metadata labeling/tagging component 302 can label/tag resource request data with a MAC address associated with a base station device and/or a satellite the device. The Wi-Fi device 300 can receive resource request data via a reception component 304 and transmit the resource request data via a transmission component 306. The Wi-Fi device 300 can also comprise a registered jack (RJ) 45 port 308 to facilitate Ethernet connectivity, and an LTE chipset component 310 to facilitate communication with the base station device. It should be noted that the LTE chipset component 310 can be any other wireless technology including, but not limited to, UMTS or CDMA.

Figure 4:
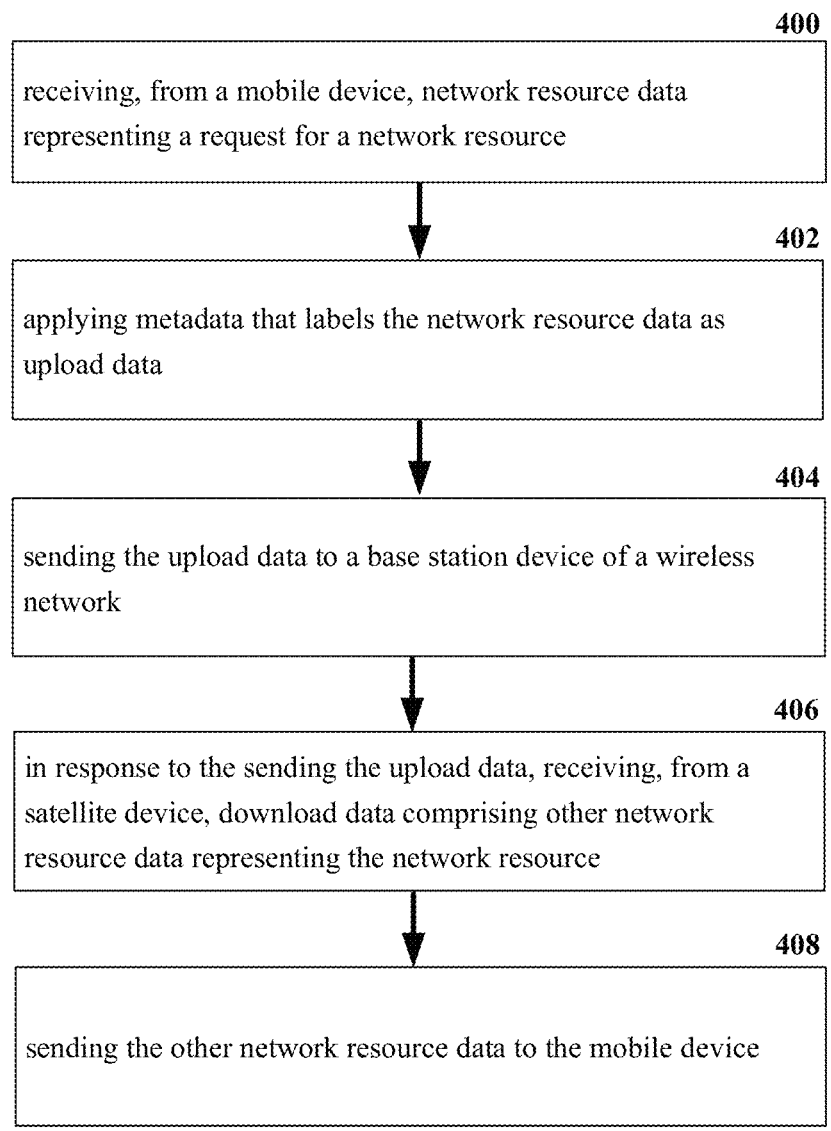
FIG. 4 illustrates an example schematic system block diagram of resource request data upload, metadata labeling, and resource data download according to one or more embodiments.

Referring now to FIG. 4, illustrated is a an example schematic system block diagram of resource request data upload, metadata labeling, and resource data download according to one or more embodiments. At element 400, a network device can receive resource data representing a request for a network resource. The request can comprise a request for a web site, video, music, etc. The network device can apply metadata that labels the network resource data as upload data at element 402. The upload data can be received from a mobile device requesting a network resource such as a web site. The network device can send the upload data to a base station device of a wireless network at element 404. In response to the sending the upload data at element 404, the network device can receive download data comprising other network resource data representing the network resource from a satellite device at element 406. At element 408, the other network resource data can be sent to a mobile device.

Figure 5:
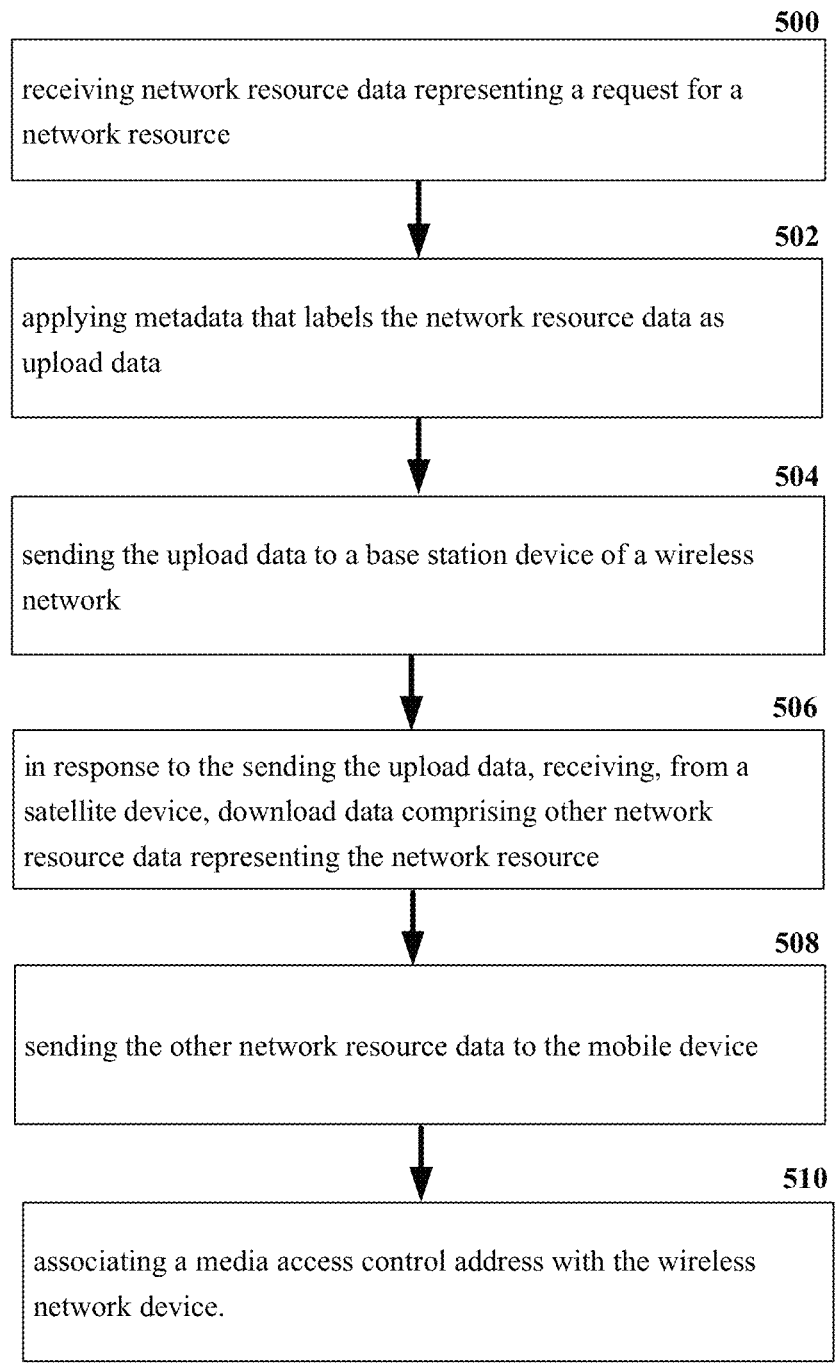
FIG. 5 illustrates an example schematic system block diagram of resource request data upload, metadata labeling, resource data download, and associating a media access control address with a network device according to one or more embodiments.

Referring now to FIG. 5, illustrated is an example schematic system block diagram of resource request data upload, metadata labeling, resource data download, and associating a media access control address with a network device according to one or more embodiments. At element 500, a network device can receive resource data representing a request for a network resource. The request can comprise a request for a web site, video, music, etc. The network device can apply metadata that labels the network resource data as upload data at element 502. The upload data can be received from a mobile device requesting a network resource such as a web site. The network device can send the upload data to a base station device of a wireless network at element 504. In response to the sending the upload data at element 504, the network device can receive download data comprising other network resource data representing the network resource from a satellite device at element 506. At element 508, the other network resource data can be sent to a mobile device, and a media access control address can be associated with the wireless network device at element 510.

Figure 6:
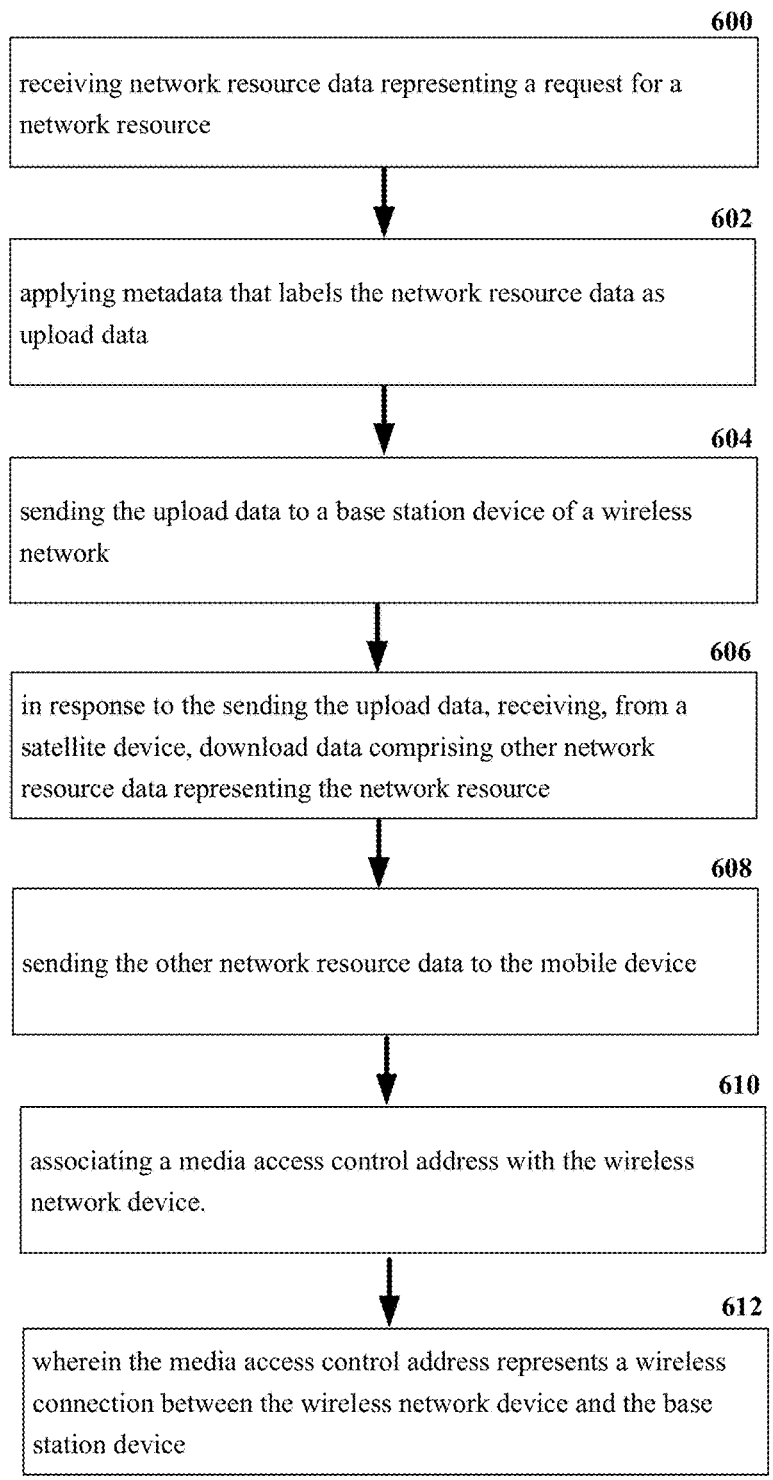
FIG. 6 illustrates an example schematic system block diagram of resource request data upload, metadata labeling, resource data download, and associating a media access control address representing a wireless connection with a network device according to one or more embodiments.

Referring now to FIG. 6, illustrated is an example schematic system block diagram of resource request data upload, metadata labeling, resource data download, and associating a media access control address representing a wireless connection with a network device according to one or more embodiments. At element 600, a network device can receive resource data representing a request for a network resource. The request can comprise a request for a web site, video, music, etc. The network device can apply metadata that labels the network resource data as upload data at element 602. The upload data can be received from a mobile device requesting a network resource such as a web site. The network device can send the upload data to a base station device of a wireless network at element 604. In response to the sending the upload data at element 604, the network device can receive download data comprising other network resource data representing the network resource from a satellite device at element 606. At element 608, the other network resource data can be sent to a mobile device, and a media access control address can be associated with the wireless network device at element 610, wherein the media access control address represents a wireless connection between the wireless network device and the base station device at element 612.

Figure 7:
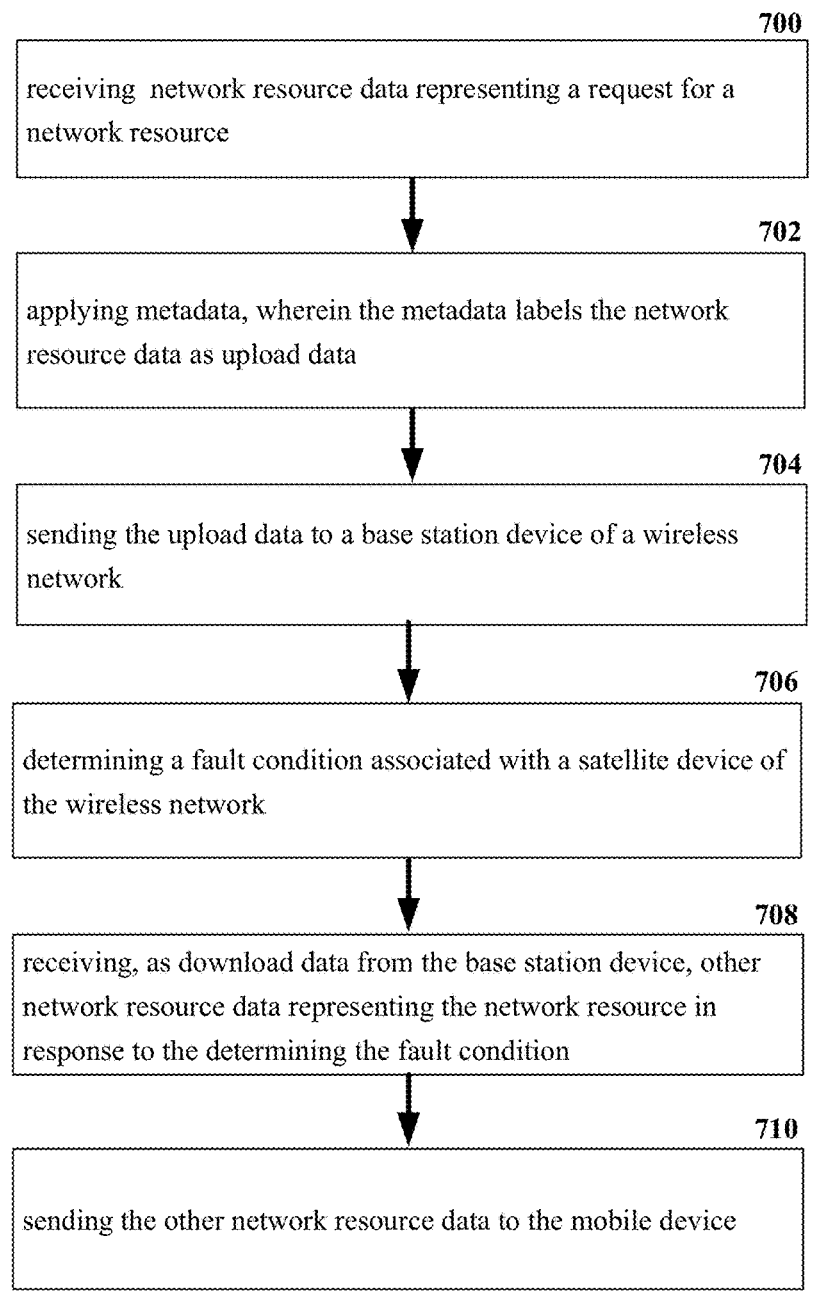
FIG. 7 illustrates an example schematic system block diagram resource request data upload, metadata labeling, determining a fault condition, and resource data download according to one or more embodiments.

Referring now to FIG. 7, illustrated is an example schematic system block diagram resource request data upload, metadata labeling, determining a fault condition, and resource data download according to one or more embodiments. At element 700, the system can receive network resource data representing a request for a network resource. The request can comprise a request for a web site, video, music, etc. At element 702, the system can apply metadata, wherein the metadata labels the network resource data as upload data and sends the upload data to a base station device of a wireless network at element 704. The system can determine a fault condition associated with a satellite device of the wireless network at element 706. The fault condition can be related to a communication failure of the satellite device. At element 708, the system can receive, as download data from the base station device, other network resource data representing the network resource in response to the determining the fault condition at element 706. The network resource data can be sent the mobile device at element 710.

Figure 8:
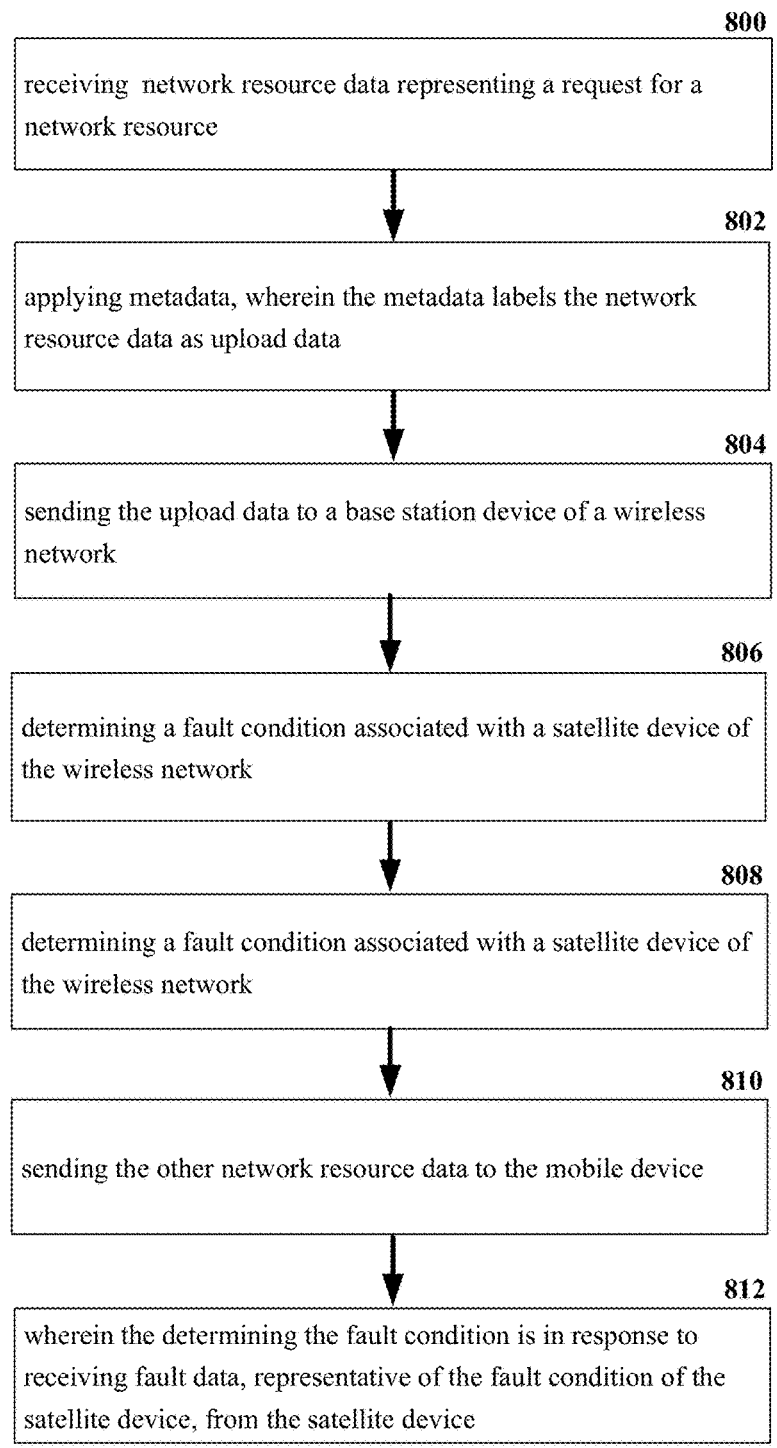
FIG. 8 illustrates an example schematic system block diagram resource request data upload, metadata labeling, determining a fault condition of a satellite device, and resource data download according to one or more embodiments.

Referring now to FIG. 8, illustrated is an example schematic system block diagram resource request data upload, metadata labeling, determining a fault condition of a satellite device, and resource data download according to one or more embodiments. At element 800, the system can receive network resource data representing a request for a network resource. The request can comprise a request for a web site, video, music, etc. At element 802, the system can apply metadata, wherein the metadata labels the network resource data as upload data and sends the upload data to a base station device of a wireless network at element 804. The system can determine a fault condition associated with a satellite device of the wireless network at element 806. The fault condition can be related to a communication failure of the satellite device. At element 808, the system can receive, as download data from the base station device, other network resource data representing the network resource in response to the determining the fault condition at element 806. The network resource data can be sent the mobile device at element 810. Furthermore, at element 812, the determining the fault condition is in response to receiving, from the satellite device, fault data representative of the fault condition of the satellite device.

Figure 9:
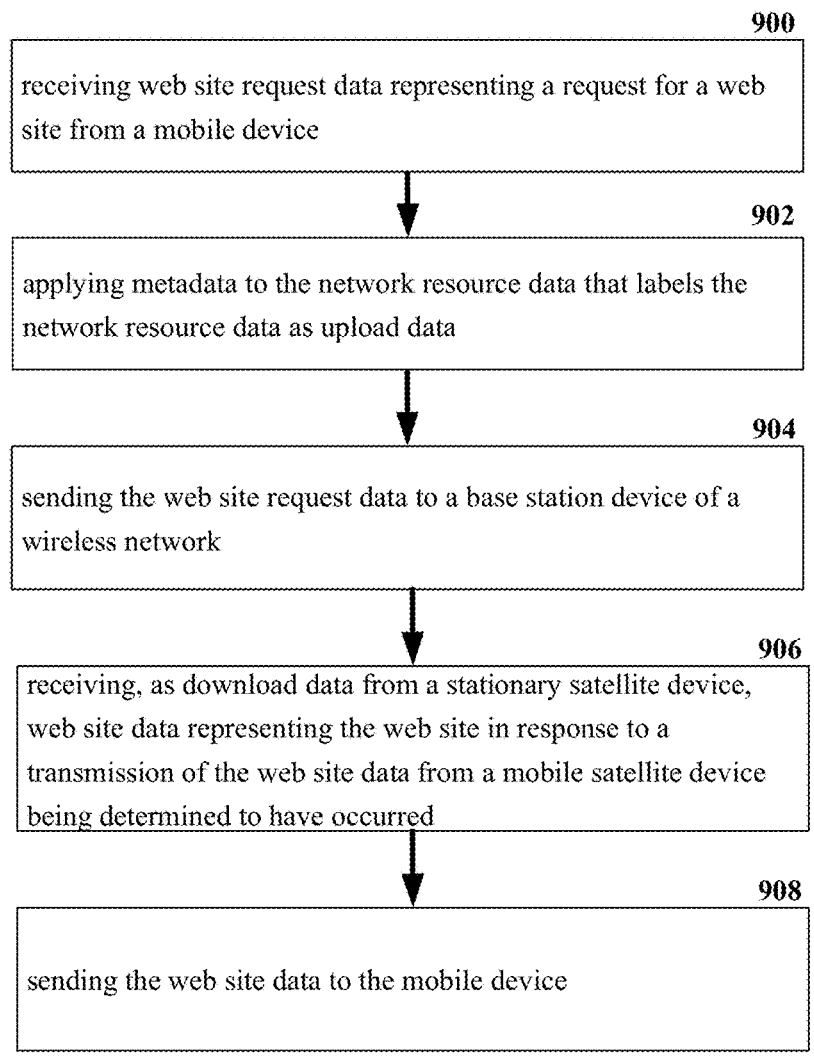
FIG. 9 illustrates an example schematic system block diagram for sending web site request data via a base station device and receiving web site data via a satellite device according to one or more embodiments.

Referring now to FIG. 9, illustrated is an example schematic system block diagram for sending web site request data via a base station device and receiving web site data via a satellite device according to one or more embodiments. At element 900, web site request data representing a request for a web site can be received from a mobile device. Metadata that labels the network resource data as upload data can be applied to the network resource data at element 902, and web site request data can be sent to a base station device of a wireless network at element 904. At element 906, web site data representing the web site can be received as download data from a stationary satellite device in response to a transmission of the web site data from a mobile satellite device being determined to have occurred. Consequently, the web site data can be sent to a mobile device at element 908.

Figure 10:
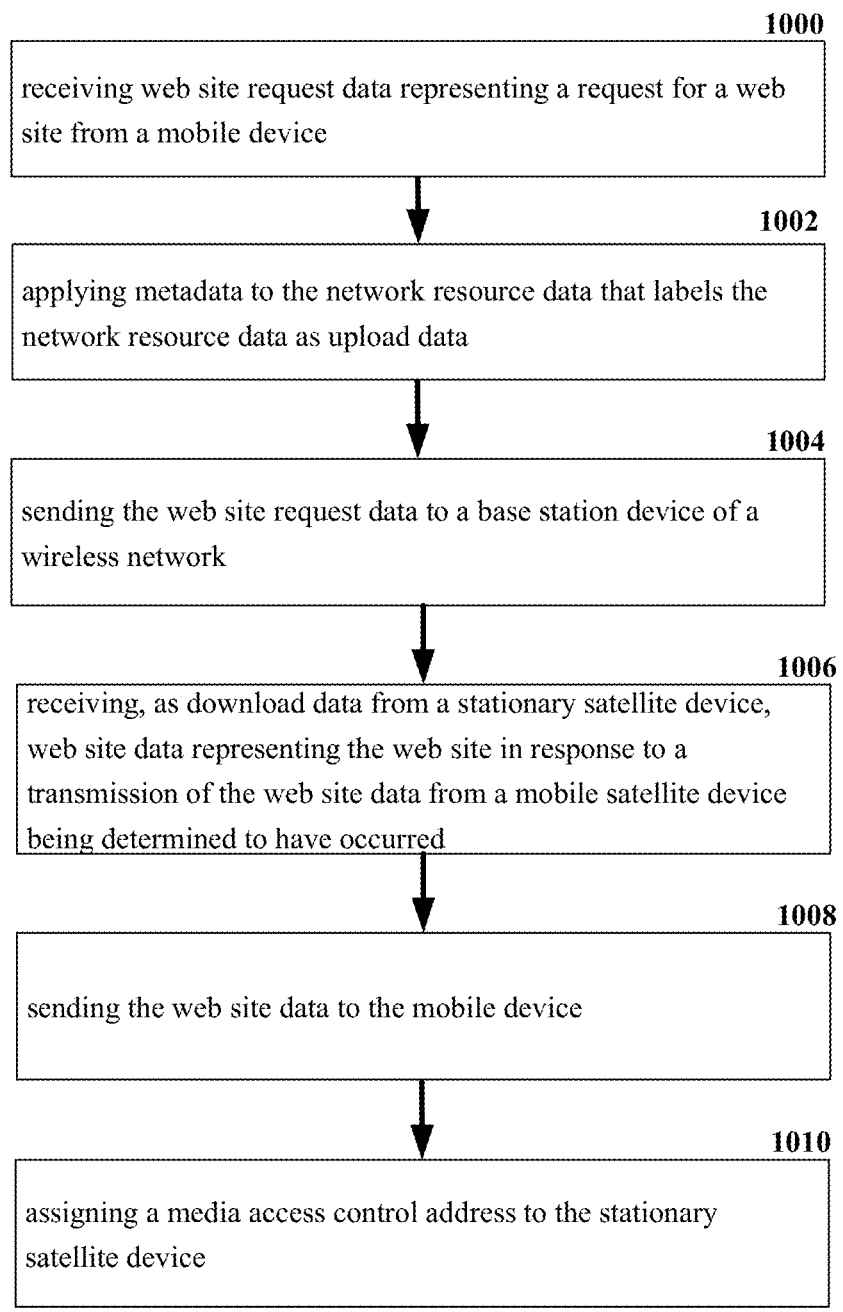
FIG. 10 illustrates an example schematic system block diagram for sending web site request data via a base station device, assigning a media access control address to a satellite device, and receiving web site data via the satellite device according to one or more embodiments.

Referring now to FIG. 10, illustrated is an example schematic system block diagram for sending web site request data via a base station device, assigning a media access control address to a satellite device, and receiving web site data via the satellite device according to one or more embodiments. At element 1000, web site request data representing a request for a web site can be received from a mobile device. Metadata that labels the network resource data as upload data can be applied to the network resource data at element 1002, and web site request data can be sent to a base station device of a wireless network at element 1004. At element 1006, web site data representing the web site can be received as download data from a stationary satellite device in response to a transmission of the web site data from a mobile satellite device being determined to have occurred. Consequently, the web site data can be sent to a mobile device at element 1008, and a media access control address can be assigned to the stationary satellite device at element 1010.

Figure 11:
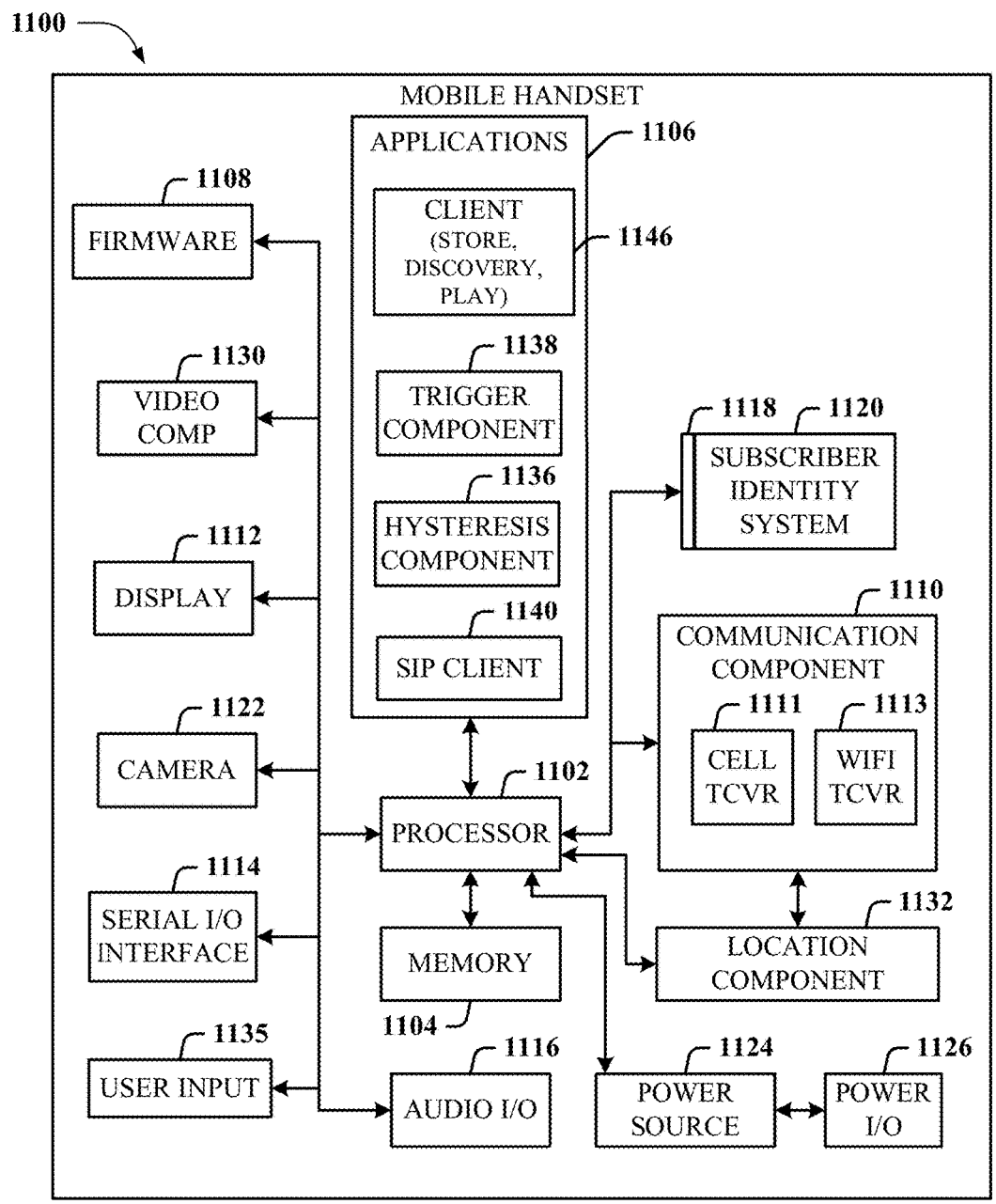
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
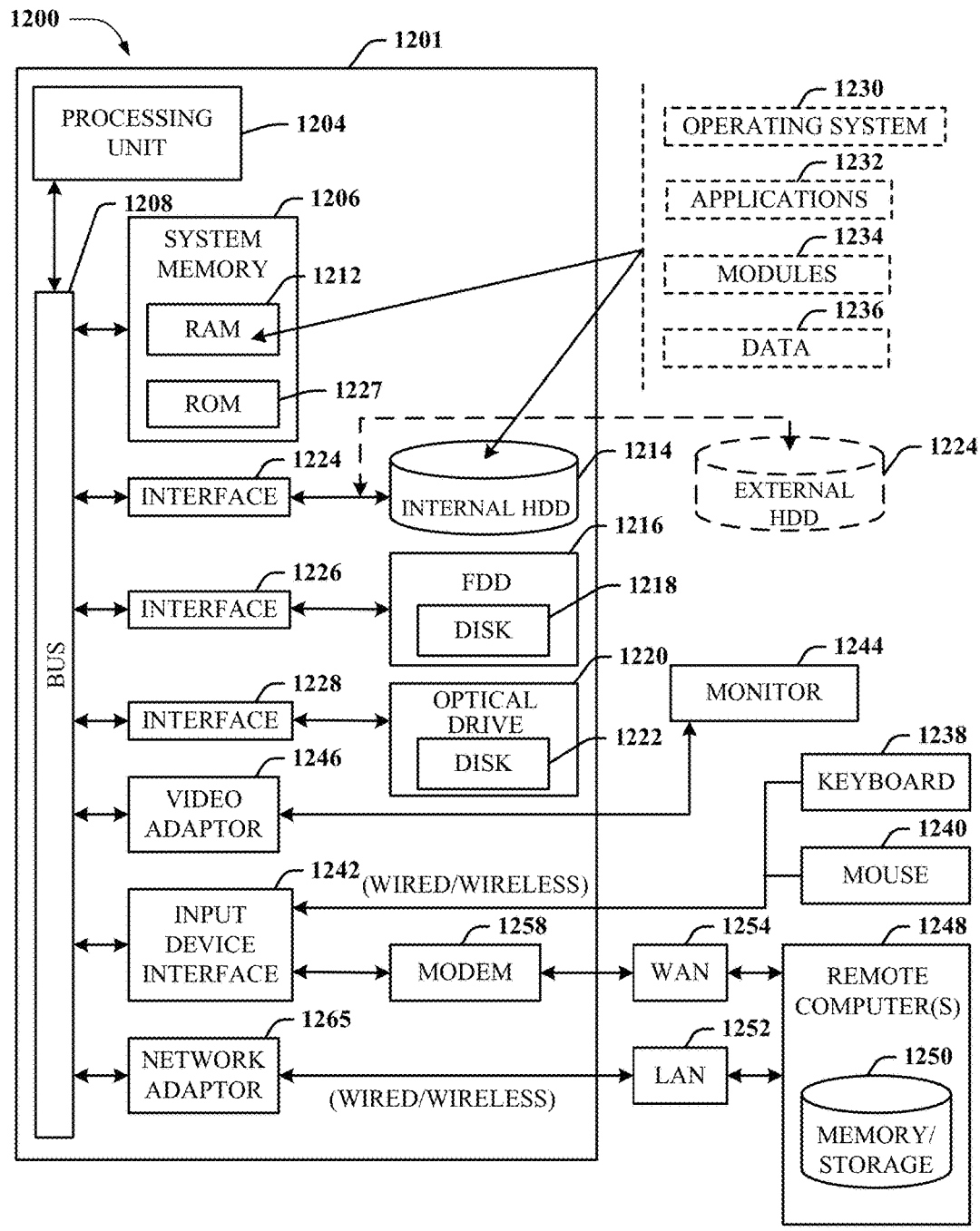
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, from a mobile device by a wireless network device comprising a processor, first network resource data representing a request for a first network resource;
applying, by the wireless network device, metadata that labels the first network resource data as upload data;
in response to a threshold condition associated with an impedance of data of a connection related to a media access control address associated with the wireless network device being determined to have been satisfied, sending, by the wireless network device, the upload data to a base station device of a wireless network;
in response to the sending the upload data, receiving, from a satellite device by the wireless network device, download data comprising second network resource data representing the first network resource; and
sending, by the wireless network device, the second network resource data to the mobile device.

2. The method of claim 1, further comprising:
associating, by the wireless network device, the media access control address with the wireless network device.

3. The method of claim 2, wherein the media access control address represents a wireless connection between the wireless network device and the base station device.

4. The method of claim 3, wherein the media access control address is a first media access control address, and further comprising:
associating, by the wireless network device, a second media access control address with the satellite device.

5. The method of claim 4, wherein the wireless connection is a first wireless connection, and wherein the second media access control address represents a second wireless connection between the wireless network device and the satellite device.

6. The method of claim 5, wherein the receiving the first network resource data comprises receiving the first network resource data via the second media access control address.

7. The method of claim 1, wherein the wireless network device comprises an integrated circuit that implements a long term evolution protocol.

8. A system, comprising:
a processor; and
a memory that stores executable instructions that, when executed by the processor, facilitate performance of operations, comprising:
receiving, from a mobile device, first network resource data representing a request for a first network resource;
applying metadata, wherein the metadata labels the first network resource data as upload data;
based on a condition associated with an impedance of data of a wireless connection associated with a media access control address of the system being determined to have been satisfied, sending the upload data to a base station device of the system;
determining a fault condition associated with a satellite device of the system;
in response to the determining the fault condition, receiving, as download data from the base station device, second network resource data representing the first network resource; and
sending the second network resource data to the mobile device.

9. The system of claim 8, wherein the determining the fault condition is in response to receiving fault data, representative of the fault condition of the satellite device, from the satellite device.

10. The system of claim 9, wherein the fault data is received via a data transmission associated with a medium access control address of the satellite device.

11. The system of claim 8, wherein the operations further comprise:
associating the upload data with the media access control address of the system.

12. The system of claim 8, wherein the media access control address of the system is a first media access control address, and wherein the operations further comprise:
in response to the determining the fault condition, removing a second media access control address associated with the satellite device.

13. The system of claim 8, wherein the operations further comprise:
monitoring the satellite device for an indication of the fault condition.

14. The system of claim 13, wherein the operations further comprise:
in response to the indication of the fault condition, sending verification data, associated with verifying the fault condition.

15. A non-transitory machine-readable storage medium, comprising executable instructions that, when executed by a processor, facilitate performance of operations, comprising:
receiving web site request data representing a request for a web site from a mobile device;
applying metadata to network resource data that labels the network resource data as upload data;
in response to a condition associated with an impedance of data of a connection related to a media access control address associated with a wireless network being determined to have been satisfied, sending the web site request data to a base station device of the wireless network;
receiving, as download data from a stationary satellite device, web site data representing the web site in response to a transmission of the web site data from a mobile satellite device being determined to have occurred; and
sending the web site data to the mobile device.

16. The non-transitory machine-readable storage medium of claim 15, wherein the operations further comprise:
assigning the media access control address to the stationary satellite device.

17. The non-transitory machine-readable storage medium of claim 15, wherein the web site data is received via the connection utilizing the media access control address.

18. The non-transitory machine-readable storage medium of claim 15, wherein the sending is a first sending, wherein the web site data is first website data, and wherein the operations further comprise:
receiving data from the stationary satellite device comprising an indication that the stationary satellite device is unavailable for a second sending of second web site data.

19. The non-transitory machine-readable storage medium of claim 18, wherein the operations further comprise:
receiving the second web site data from the base station device in response to the indication being received.

20. The non-transitory machine-readable storage medium of claim 19, wherein the operations further comprise:
sending the second web site data to the mobile device.

* * * * *